United States Patent [19]
Berry

[11] Patent Number: 5,077,930
[45] Date of Patent: Jan. 7, 1992

[54] BENDABLE FISHING LURE

[76] Inventor: William G. Berry, 20 Roxanna Dr., Ninety Six, S.C. 29666

[21] Appl. No.: 513,425

[22] Filed: Apr. 23, 1990

Related U.S. Application Data

[63] Continuation of Ser. No. 331,272, Mar. 30, 1989, abandoned.

[51] Int. Cl.$^5$ ............................................. A01K 85/00
[52] U.S. Cl. ................... 43/42.32; 43/42.22; 43/42.33; 43/42.39; 43/42.48
[58] Field of Search ................. 43/42.22, 42.39, 42.47, 43/42.45, 42.46, 42.48, 42.5, 42.32, 42.33, 42.29

[56] References Cited

U.S. PATENT DOCUMENTS

| | | | |
|---|---|---|---|
| 1,921,657 | 8/1933 | Catarau | 43/42.22 |
| 2,522,179 | 9/1950 | Jensen et al. | 43/42.22 |
| 2,624,147 | 1/1953 | Round | 43/42.32 |
| 2,861,381 | 11/1958 | Snyder | 43/42.22 |
| 3,898,758 | 8/1975 | Swanningson | 43/42.48 |
| 4,033,064 | 7/1977 | Phillips | 43/42.39 |
| 4,122,624 | 10/1978 | Smith | 43/42.33 |
| 4,199,888 | 4/1980 | Barnes | 43/42.45 |
| 4,479,323 | 10/1984 | Burr | 43/42.33 |
| 4,495,722 | 1/1985 | Hess et al. | 43/42.47 |
| 4,536,987 | 8/1985 | Sanders et al. | 43/42.34 |
| 4,637,160 | 1/1987 | Biskup | 43/42.34 |
| 4,700,503 | 10/1987 | Pippert | 43/42.09 |

Primary Examiner—Kurt Rowan
Attorney, Agent, or Firm—Bailey & Hardaway

[57] ABSTRACT

A fishing lure has a substantially flat, bendable elongated body of rigid, hard, molded lead like material with an eyelet attached preferably by being embedded adjacent each end thereof, and to which a decorative material for attracting fish is applied. The elongated relatively heavy body has a cross section with a major axis and a minor axis about which the body may be manually bent, and because of the weight of the material casting is facilitated. Molding the body while attaching the eyelets and thereafter coating the body and applying a reflective material which may include an adhesive tape thereto simplifies the manufacture of the lure.

9 Claims, 2 Drawing Sheets

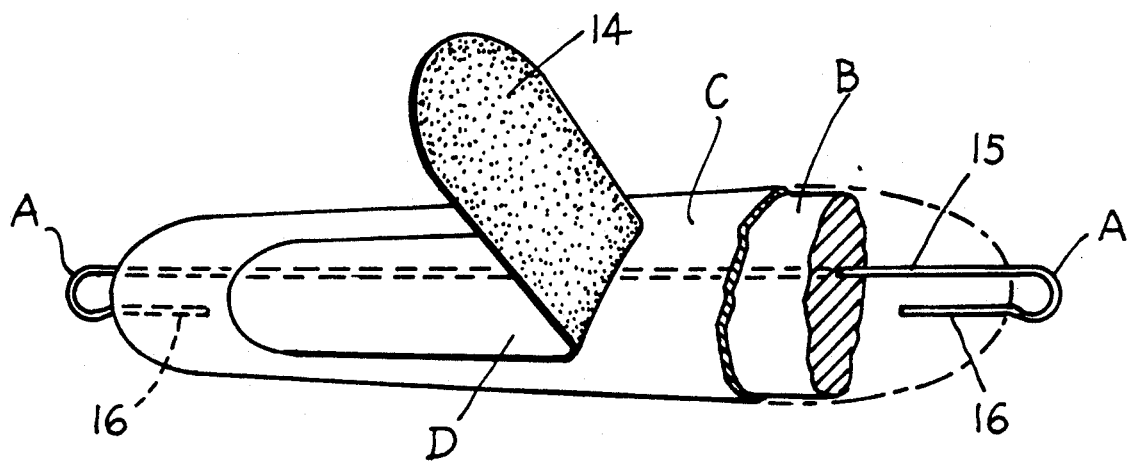
Fig. 5.
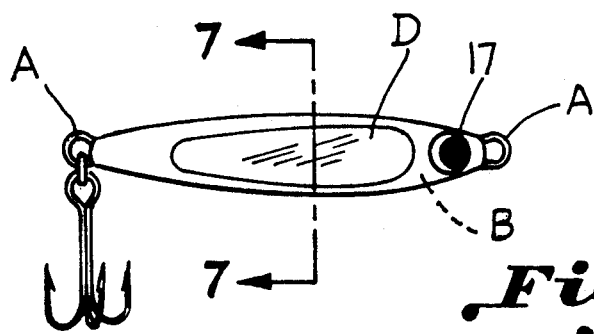
Fig. 6.
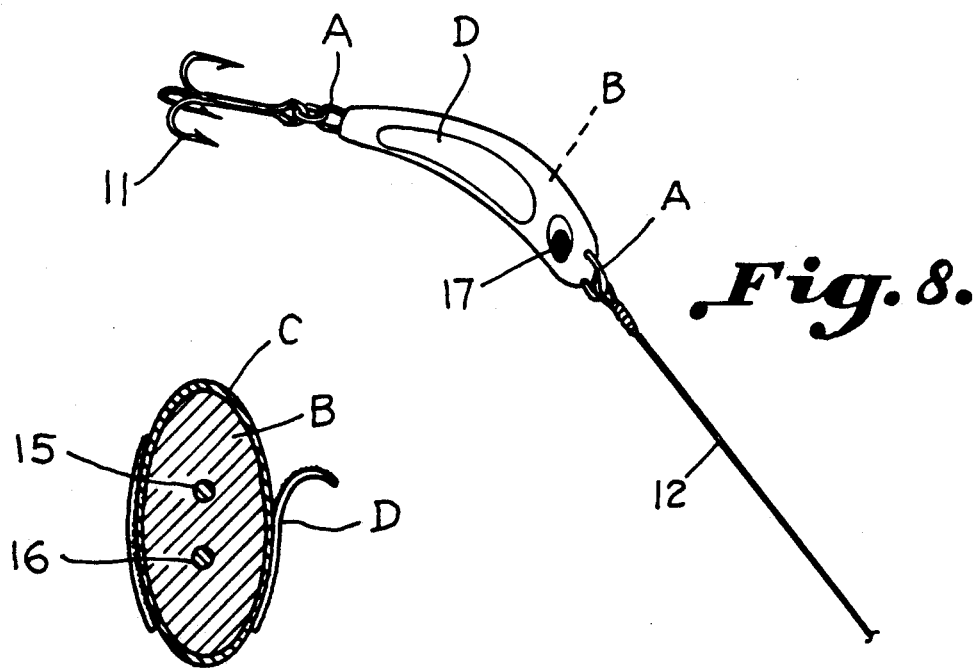
Fig. 8.
Fig. 7.

BENDABLE FISHING LURE

This application is a continuation of application Ser. No. 07/331,272, filed Mar. 30, 1989 now abandoned.

BACKGROUND OF THE INVENTION

Fishing lures have been provided generally in the shape of spoons and minnows having a line attachment means on one end and hook attachment means on the other, often in the form of embedded or otherwise rigidly attached eyelets. The bodies of such lures have been painted or otherwise coated with reflective material applied as by dipping. Such lures have been bent or weighted so as to provide a variety of movements or actions as, for example, simulating an injured minnow so as to attract fish.

The use of reflective paint or material on lures is illustrated in U.S. Pat. Nos. 284,056 and 564,839. A lure having a bright color is illustrated in U.S. Pat. No. 1,805,416. The fishhook of U.S. Pat. No. 1,390,767 has a body of pliable lead while the sinker of U.S. Pat. No. 2,591,294 has a spoon shape with attachment means on one end. A sinker having a particulate puttylike mass of sinker composition or heavy material is attachable to a fishing line assembly.

It is an important object of this invention to provide a lure which is constructed of heavy moldable lead like material which may be bent by the fisherman as desired to vary the action of the lure while casting is facilitated avoiding the addition of at least part of additional sinker material as may otherwise have been necessary to cause the lure to sink and act as desired for a lure of given shape and appearance.

It is also an important object of the invention to provide a line to which a reflective tape which may have an iridescent appearance has been adhesively applied.

Another important object of the invention is the provision of a lure having a body which may be molded of lead like material to which eyelets may be attached during molding and which may be coated with a water resistant bendable material and to which reflective material may be applied in the material or otherwise as by a reflective adhesive tape.

SUMMARY OF THE INVENTION

A fishing lure having a flat body as in the form of a spoon or a minnow, for example, may be molded of lead and the like while attaching eyelets adjacent each end. Decorative material for attracting fish may be applied to the molded body in the form of a coating such as a vinyl paint. Additional decorative material such as a reflective tape may be adhesively attached.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is an enlarged perspective view, partially in section and with parts broken away and pealed back for the purpose of illustrating the molded construction of the lead body and the decorative material applied thereto;

FIG. 6 is a side elevation illustrating a modified form of the invention in the general configuration of a minnow;

FIG. 7 is a transverse sectional elevation taken on the line 7—7 in FIG. 6 further illustrating the use of decorative material including a coating and a flexible tape which has been adhesively applied to the body; and FIG. 8 is a perspective view with line attached illustrating a bent configuration of the body as having been applied by the fisherman to vary the action of the lure.

DESCRIPTION OF A PREFERRED EMBODIMENT

A fishing lure is illustrated having an elongated wire with a pair of eyelets A carried adjacent each end of the wire. A lead body B is formed by molding about the wire leaving the eyelets exposed adjacent respective ends thereof. A coating C is thereafter applied on the lead body. A reflective tape member D is carried by and extends along the body. The body is elongated such that eyelets A define a longitudinal axis proceeding through the body. The body further has a cross section defining a major and a minor axis, as can be seen in FIG. 7. The body, therefore, has a generally flat bendable configuration. Thus, the body may be manually bent at any point along the longitudinal axis at right angles about the major axis or twisted by a fisherman about the longitudinal axis to vary the action of the lure and casting of the lure is facilitated without additional weights. The eyelets may be otherwise rigidly attached or secured for attachment of a line on one end and hooks on the other end. The eyelets A may be bent or otherwise formed as at each end of an elongated wire which may be molded and thereby embedded in the lead body.

FIGS. 1-4 illustrate a spoon type lure constructed in accordance with the invention with additional decorative or fish attracting material such as a deer tail or buck tail 10 attached with the hooks 11 as to the hook eyelet 11a by a swivel member 11b to one of the eyelets A opposite the line 12. The body B may be bent at any point along the longitudinal axis or otherwise adapted to proceed through the water with the major axis of the body horizontal, vertical or revolving about the longitudinal axis, giving the lure a swimming, or other fish-enticing motion. The vinyl or otherwise water resistant or repellant bendable coating or paint C may be suitably applied after molding to the body B as by spraying or dipping. Additional decorative material, not shown, may be carried in the paint or coating material and be applied therewith to the body.

Figure 1:
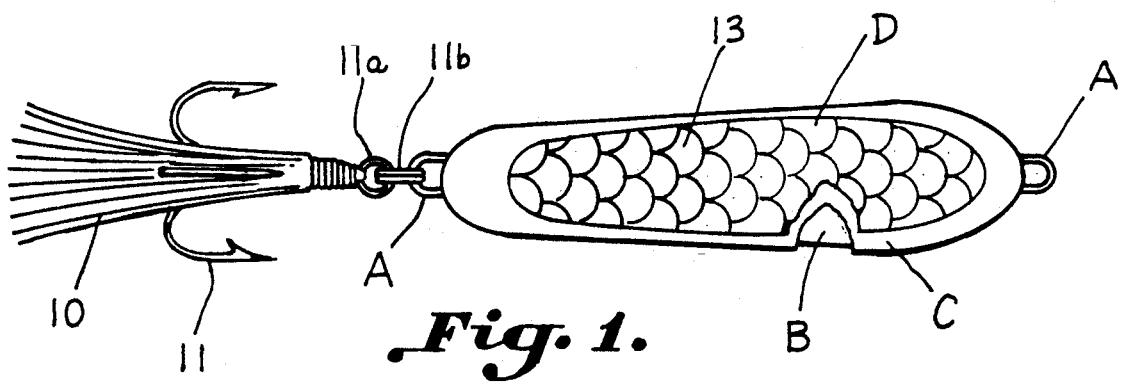
FIG. 1 is a plan view illustrating a fishing lure having a spoon like configuration with hooks attached constructed in accordance with the invention.
Figure 2:
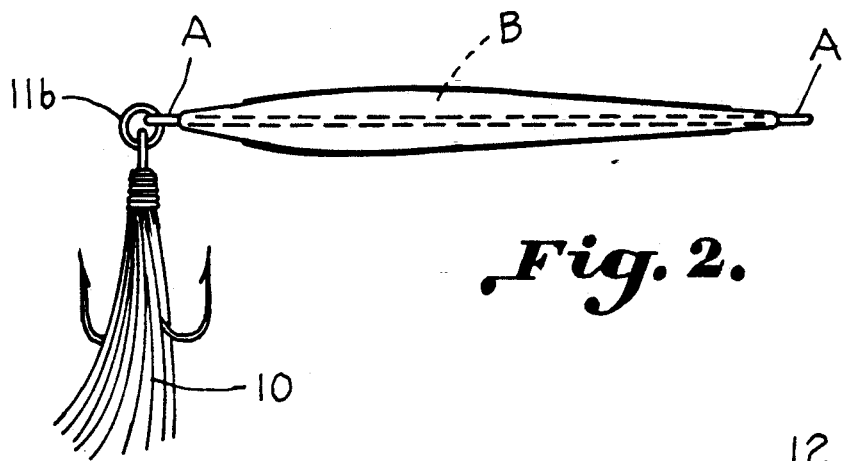
FIG. 2 is a side elevation of the lure illustrating the body.
Figure 4:
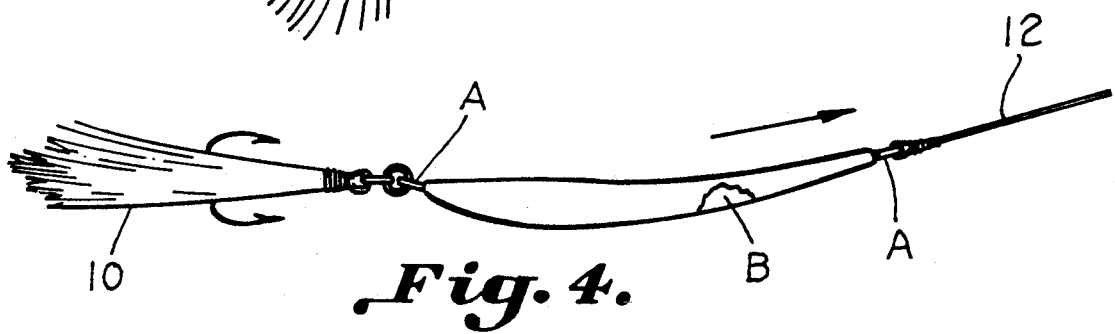
FIG. 4 is a side elevation of the lure body after bending with line attached.
Figure 3:
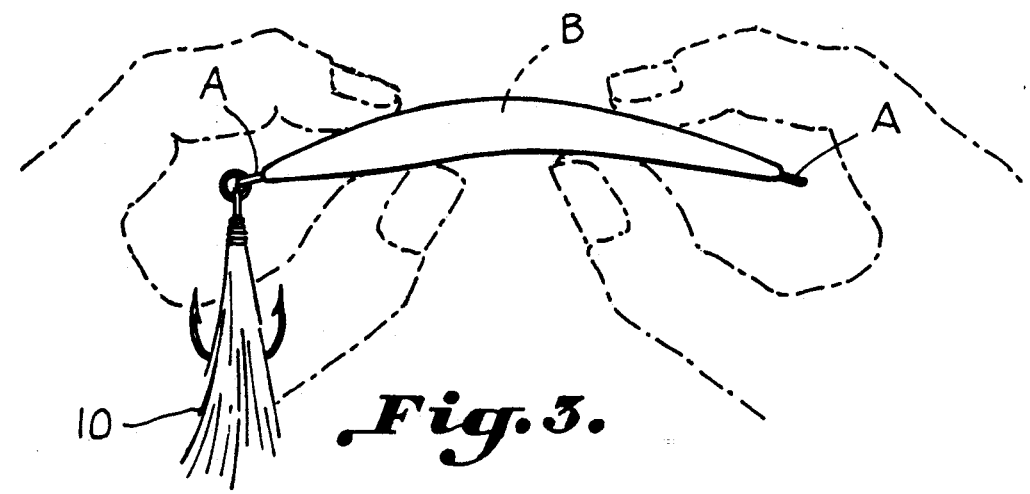
FIG. 3 is a side elevation of the lure body being manually bent as by a fisherman.

Additional decorative material may be thereafter applied and may be in the form of a flexible tape which may have a reflective or even iridescent surface 13 as illustrated in FIG. 1. Suitable means are provided for attachment of the reflective material such as adhesive material 14 applied to the back of the tape as illustrated in FIG. 5.

The eyelets A are preferably bent into each end of an elongated wire having a portion 15 intermediate the eyelets and ends 16 ben back in alignment with the intermediate portion 15 to facilitate attachment.

A modified form of the invention is illustrated in FIGS. 6–8 in the form of a minnow to which additional decorative material in the form of an eye 17 is painted or otherwise applied.

A variety of decorative material and construction techniques may be utilized in addition to those illustrated and described.

While a preferred embodiment of the invention has been described using specific terms, such description is for illustrative purposes only, and it is to be understood that changes and variations may be made without departing from the spirit or scope of the following claims.

What is claimed is:

1. An elongated fishing lure for continuous movement through the water comprising:
    a lead body having a pair of spaced eyelets adjacent respective ends of said body for attachment of a line on one end and a hook on the other end of the body, said body having a mass such that casting of the lure can be accomplished without additional weights;
    a protective coating on said lead body;
    an adhesive reflective member mounted on said coating extending along the length of said lead body; and
    said lead body being elongated such that said eyelets define a longitudinal axis proceeding through the body axis, said body further being formed to allow bending at any point along said longitudinal axis said body prior to bending having substantially symmetrical surface configurations to facilitate continuous movement through the water;
    whereby the action of the lure can be varied by the fisherman as desired to give the lure a swimming or other fish-enticing motion as it proceeds through the water.

2. The structure set forth in claim 1 including an elongated wire extending entirely through said body forming said eyelets adjacent each end thereof.

3. The structure set forth in claim 1 wherein said reflective member is an adhesive tape.

4. The structure set forth in claim 1 wherein said body is generally flat and in the shape of a minnow.

5. The structure set forth in claim 1 wherein said body is flat and generally spoon shaped.

6. The method of making an elongated fishing lure adapted to be continuously moved through the water comprising the steps of:
    molding an elongated body of lead of such mass that the lure may be cast without additional weights
    embedding eyelets in said body such that said eyelets define a longitudinal axis proceeding through said body;
    coating said lead body with a water resistant coating;
    applying an adhesive reflective member to said water resistant coating, whereby the action of the lure can be varied by the fisherman as desired to give the lure a swimming or other fish enticing motion as it proceeds through the water by bending said body at any point along said longitudinal axis.

7. The method of claim 6, wherein the adhesive reflective material is applied as an adhesive tape with a reflective surface.

8. The method of claim 6, wherein decorative material is applied with said vinyl coating.

9. The method of making an elongated fishing lure adopted to be continuously moved through the water comprising the steps of:
    molding an elongate body of lead of such mass that the lure may be cast without additional weight;
    embedding eyelets in said body such that said eyelets define a longitudinal axis proceeding through said body;
    coating said body with a vinyl coating having a decorative material carried in said coating;
    whereby the action of the lure can be varied by the fisherman as desired to give the lure a swimming or other fish enticing motion as it proceeds through the water.

* * * * *